United States Patent [19]

Thomas et al.

[11] Patent Number: 4,636,779

[45] Date of Patent: * Jan. 13, 1987

[54] ACOUSTIC DETECTION OF TOOL BREAK EVENTS IN MACHINE TOOL OPERATIONS

[75] Inventors: Charles E. Thomas, Scotia; William S. Yerazunis, Troy; Joseph W. Erkes, Albany; Minyoung Lee, Schenectady, all of N.Y.

[73] Assignee: General Electric Company, Schenectady, N.Y.

[*] Notice: The portion of the term of this patent subsequent to Jan. 13, 2004 has been disclaimed.

[21] Appl. No.: 664,189

[22] Filed: Oct. 24, 1984

[51] Int. Cl.$^4$ ............................................. G08B 21/00
[52] U.S. Cl. ............................... 340/680; 340/683; 73/104; 73/660
[58] Field of Search ................... 340/680, 683, 679; 364/475; 73/104, 660, 593, 658; 364/507, 508, 550, 551

[56] References Cited

U.S. PATENT DOCUMENTS

| | | | |
|---|---|---|---|
| 3,793,627 | 2/1974 | Darrel et al. | 340/680 |
| 3,842,663 | 10/1974 | Harting et al. | 73/67.2 |
| 4,087,801 | 5/1978 | Noh | 340/680 |
| 4,332,161 | 6/1982 | Kakino | 73/104 |
| 4,413,507 | 11/1983 | Drew et al. | 73/104 |
| 4,471,444 | 9/1984 | Yee et al. | 364/475 |
| 4,514,797 | 4/1985 | Begin | 340/680 |

FOREIGN PATENT DOCUMENTS 52-48183  4/1977  Japan .................................. 73/104

Primary Examiner—James L. Rowland
Assistant Examiner—Jeffery A. Hofsass
Attorney, Agent, or Firm—Donald R. Campbell; James C. Davis, Jr.; Paul R. Webb, II

[57] ABSTRACT

A system and method for monitoring vibrations of a cutting tool produced by tool break events, and for interpreting them to detect tool breaks of sufficient magnitude to endanger the machined part. The signal generated by a sensor such as an accelerometer is preprocessed to attenuate low frequency machining noise and detect the energy in a higher frequency band, then sampled, and the digitized signal samples analyzed by tool break detection logic. This logic is triggered by a positive-going signal transient, and prevents false alarms on minor tool break events that do not mar the workpiece and on noise from other sources.

10 Claims, 8 Drawing Figures

SAMPLES OF PROCESSED ANALOG SIGNAL

SUSPICION  CONFIRM
PROCESSED VIBRATION SIGNAL

SUSPICION  CONFIRM
PROCESSED VIBRATION SIGNAL

SUSPICION  DISMISS
PROCESSED VIBRATION SIGNAL

SUSPICION  DISMISS
PROCESSED VIBRATION SIGNAL

ACOUSTIC DETECTION OF TOOL BREAK EVENTS IN MACHINE TOOL OPERATIONS

BACKGROUND OF THE INVENTION

This invention relates to a tool break detector and to a method of monitoring cutting tool vibrations to detect significant tool breakage and prevent false alarms on other vibration noise.

In normal machining operations tool break events are not rare, and they can be very frequent under such conditions as heavy cutting of exotic aircraft engine materials with brittle ceramic tools. The timing of such tool break events, particularly with ceramic tools, cannot be reliably predicted. This situation constitutes a major deterrent to several important approaches to increasing metal-cutting procedure productivity. The approach of assigning two machines to one man is currently considered not to be practical when using brittle ceramic tools in heavy machining, or even when using tough carbide tools near the limits of their capabilities, so some of the advantage of two machines per man is lost in necessary reductions in productivity rates of the individual machines. Automated closed-loop machining cannot safely be applied without a reliable tool break detection technique to prevent marring of the workpiece.

The problem of detecting tool breakage has been studied for many years and devices for this application are on the market. Some of these devices monitor feed or spindle power and some monitor feed forces. In general, they are less than totally satisfactory for reasons of cost, slow response, difficulty in mounting arrangements for some machines, and false alarm problems. Nonetheless, the need for this function has been great enough to result in a number of installations, and in plans for their use even in closed loop machining applications of the future. The present tool break detector, to give a few of its properties, has faster response and greater sensitivity than power and force monitoring systems, and is less sensitive to false alarms than existing acoustic emission detection systems that rely solely on detection of the emission produced by tool fracture. It has more capability than the acoustic emission systems for avoiding alarms on tool break events that do not significantly affect cutting conditions, and is more sensitive in detecting significant tool break events when the actual tool fracture emission signal is masked by high cutting noise.

SUMMARY OF THE INVENTION

An object of the invention is to provide a cutting tool break detection system that improves on state-of-the-art devices in cost, response time, sensitivity, ease of installation and reliability.

Another object is the provision of such a system and method that can discriminate between minor tool breaks and breaks major enough to cause significant marring of the workpiece.

Another object is to extract tool break detection clues from both the acoustic emission energy produced by the break event itself, and from changes in the background cutting noise caused by changed cutting conditions after the break event. This permits matching the tool break signature detection criteria to the needs of high productivity machining, where high cutting noise sometimes masks the acoustic emission energy, and where it is important to avoid stopping the machining process on false alarms associated with minor tool break events and spurious noise sources.

Another object is to avoid the need for elaborate teaching cycles and measurements before the tool break detection system can be set up to operate on a new workpiece. Systems based on absolute horsepower or force limits must use test cuts to determine normal deviations of the sensed parameter levels throughout all cuts to be made in machining the part. Their utility is generally limited to applications in which large numbers of identical parts are to be machined, as opposed to those in which many different parts are to be machined. This invention relies primarily upon detection and interpretation of transients and level shifts of the vibration signal, rather than crossings of absolute limits, and thus is able to provide good tool break detection performance without the use of any prior information on the specific cuts to be made.

Another object of the invention is to minimize the problems of installing and operating the tool break detection system. The sensor is small and rugged, and a single sensor mounted a reasonable distance from the tool-workpiece interface is usually sufficient. The acoustic frequency band is chosen to discriminate against machinery noise below about 30 KHz and avoid the use of high frequencies above 100 KHz, which suffer high attenuation in the propagation path.

Yet another object is to provide an improved tool break detector which is easily integrated with an acoustic tool touch detector in a combined cutting tool break and touch detection system. This minimizes the amount of special monitoring equipment required to provide both functions.

A broadband vibration sensor, such as an accelerometer which is most sensitive to frequencies around a resonant frequency, typically 30 KHz and above, is positioned on the machine tool to sense vibrations at the tool-workpiece interface during the machining process. An analog preprocessor has a high-pass filter to attenuate low frequency machining noise, and a full wave energy detector to rectify and low-pass filter the signal. The 500 Hz or less cutoff frequency of the low-pass filter prevents aliasing from the subsequent sampling operation. The unipolar output signal of the analog preprocessor is sampled, and the samples converted to digital form and then analyzed by digital circuitry, which may be a programmable general purpose computer. The tool break detection logic alarms on major tool break events capable of damaging the workpiece, and prevents false alarms on minor tool break events that can be ignored and on transient spikes and spurious noise from other sources.

The digital circuitry has provision for calculating the running mean signal level of a selected number of signal samples. A transient detector compares every new sample with the running mean signal value of N previous samples to detect a transient or abrupt increase in signal level that may have its source in a major tool break event. A mean shift detector compares the mean signal level after and before such a transient to detect a shift in mean level and thus a substantial change in background cutting noise. A mean shift persistence detector makes a check that the shift in mean level persists for a given period. A tool break alarm is generated only after confirmation of a major or significant tool break event meeting these tests. In practicing the method, detection of a transient not followed by a shift in background noise level results in dismissal and return to the transient detect phase, and failure to meet the persistence check causes dismissal and return to transient detect. A tool break alarm is generated only when all the criteria are satisfied.

DETAILED DESCRIPTION OF THE INVENTION

Figure 1:
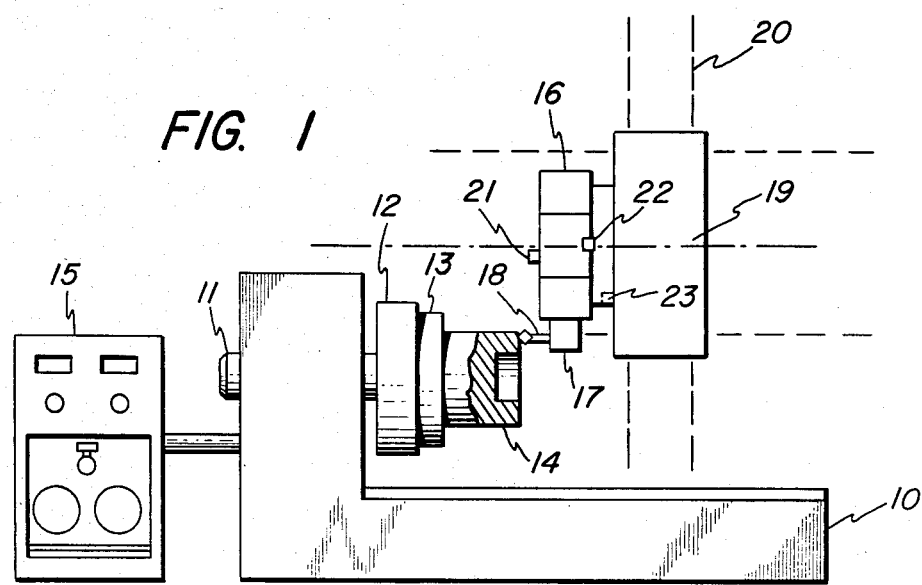
FIG. 1 is a partial elevational view of a horizontal turret lathe showing alternative positions of the accelerometer.

The cutting inserts of metal-cutting lathes break under a variety of different machining conditions and these tool break events produce a variety of different vibration signal signatures. Some of the machining conditions that affect the nature of the tool break vibration signature and spurious noise characteristics are the type and precise composition of the insert material, the shape of the insert and other geometry factors, methods of mounting the insert in the tool holder, and there are others. This machine tool monitor analyzes the vibration signal and separates those signal signatures caused by significant tool break events from those caused by either spurious noise sources or insignificant tool break events.

In general, a tool break event produces a vibration signature with two parts, an acoustic emission in the form of one or more short spikes caused by the sudden cracking of the insert material, and a change in the cutting noise signal due to a change in the cutting conditions caused by the broken insert cutting differently from the unbroken insert.

Concerning the first, acoustic emission caused by cracking of the insert, the change in the state of the insert may or may not change conditions at the cutting edge. Cutting conditions may remain unchanged if:

(a) The cracking is limited to internal crack growth, with no effect on the exterior surface of the insert;

(b) The cracking extends through the exterior surfaces of the insert but the separate pieces of the cracked insert are prevented from falling away by the compressive forces of the insert mounting arrangements and the cutting process;

(c) The cracking causes a piece of the insert to fall away, but the piece does not involve the cutting edge and does not jam against the workpiece.

Concerning the second, a change in cutting noise signal due to a change in cutting conditions, these cutting condition changes may be:

(a) Reduced depth of cut due to removal of part of the insert;

(b) Increased depth of cut due to a piece broken from the insert jamming against the workpiece;

(c) Increased workpiece surface roughness due to a jagged edge on the broken insert.

The definitions of a significant or major tool break vary with the objectives of the operator and the nature of the parts he makes, including such factors as roughing, intermediate or finish cuts, degree of human supervision available, value of the machined part, etc. However, it is usually the case that only a break that threatens immediate damage to the part or tool holder, or would force a recut, is considered significant. The tool break detector should ignore other tool breaks to avoid unnecessary interruptions of the cutting process, and consequent reduced productivity.

The mounting location of the vibration sensor for tool break detection is determined individually for each machine tool to be monitored. The considerations are the same as for a tool touch detector and are fully explained in copending application Ser. No. 645,203, filed Aug. 29, 1984, C. E. Thomas et al., "Acoustic Detection of Contact Between Cutting Tool and Workpiece". There are a number of sometimes conflicting objectives to be traded off in selecting and evaluating a sensor mounting location on a machine tool. Among these are the following. First, acoustic coupling of the band of vibration signals containing the tool break event signal information. These signals are generated at or near the interface between the cutting tool insert and the workpiece. Before they can be detected, they must propagate to the sensor location. Attenuation and distortion in the propagation path are functions of path distance and geometry, and especially of the number of mechanical interfaces between source and sensor. Second, location of spurious signal sources. Some sources of spurious signals are located near the desired signal sources and reach the sensor through the same or similar paths. However, on any given machine, sources like hydraulic valves, bearings, and auxiliary equipment may have other locations with more or less favorable propagation paths to a particular sensor mounting location. It is desirable that the sensor be mounted where its acoustic coupling to the signal sources is relatively good, and its acoustic coupling to major interference sources is relatively poor. Third, physical protection of the sensor and its cabling. The best sensor location from an acoustic coupling standpoint is usually on the tool holder near the cutting edge of the tool insert. However, such a mounting position exposes the sensor, its cable, and cable connectors to an extremely hostile physical environment in terms of forces, temperature, and cutting fluid contamination. Fourth, minimization of sensors and sensor signal processing channels. In machines with several holder mounting positions, a decision to mount the sensor on the tool holder implies a sensor and signal processing channel for each tool holder mounting position. This is highly undesirable. Fifth, available physical space, which varies greatly from machine to machine. The sensor and integrated electronics package of this invention is physically very small, thus increasing the mounting location options available.

Figure 2:
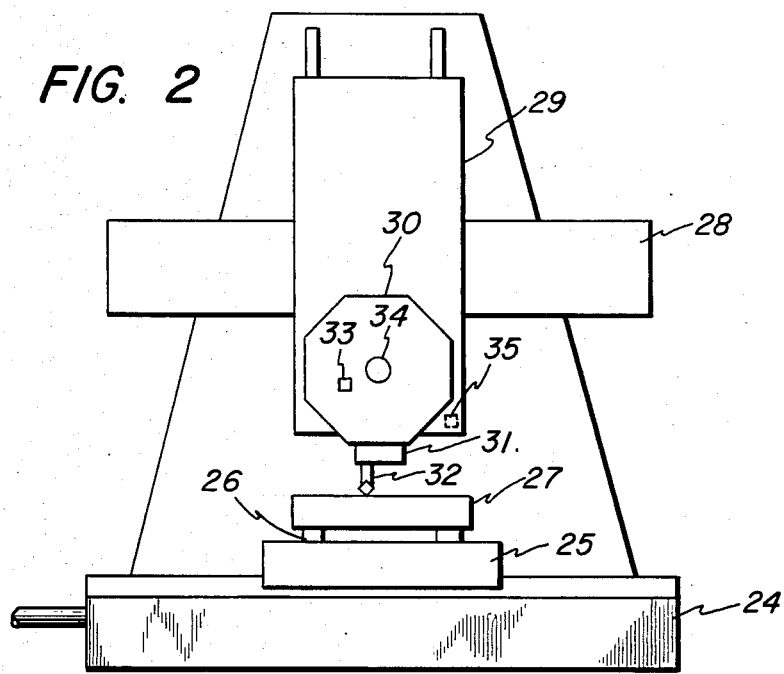
FIG. 2 is a simplified elevational view of a vertical turret lathe and alternative sensor positions.

FIGS. 1 and 2 are simplified drawings of horizontal and vertical turret lathes; the monitor has some applicability to other types of machine tools such as milling machines, machining centers, and drills. The portion of the horizontal turret lathe illustrated has a machine frame 10, spindle shaft 11, chuck 12, fixture 13 for holding the workpiece 14, and a NC control station 15. A rotatable tool turret 16 has several tool posts 17 to support the tool holder and insert 18. The turret 16 is supported on a turret mount 19 which in turn has movement along the two cross slides 20. A vibration sensor 21 such as a broadband accelerometer is mounted on turret 16; thus a single sensor in a single mounting position can monitor any tool holder position the operator selects for the cutting operation. This mounting location will usually provide a satisfactory signal to spurious noise ratio. Since the turret can be rotated, and in many machines only in one direction, the sensor cannot be electrically connected to stationary signal processing electronics through simple cables. A rotating electrical coupler 22 is one way of transferring the electrical signal outputted by the transducer. Optionally, the vibration sensor 23 is mounted on the cross slide where no rotating coupler is required and tests have shown that good operation is obtained on some lathes. Whether the sensor can be mounted off the turret is a matter that must be experimentally determined on each machine to be monitored.

A vertical turret lathe is illustrated in FIG. 2 and two suitable vibration sensor mounting locations are shown. The parts illustrated are: the machine frame 24, chuck 25, work holding fixture 26, workpiece 27, cross slide 28, vertical slide 29, rotatable tool turret 30, tool post 31, and tool holder and cutting insert 32 (the numerical control unit is not shown). The vibration signal generated by turret-mounted sensor 33 is transmitted through the rotating electrical coupling 34 to the tool break detection circuitry. An alternative mounting location is on one of the machine tool slides; sensor 35 is in good acoustic contact with vertical slide 29.

This tool break detector approach detects acoustic vibrations in the 30 to 100 KHz region and uses pattern recognition techniques to distinguish from the background noise the effects of tool break events. It makes use of both acoustic emissions produced by the rupture of the tool insert material, and changes in the cutting noise background that have their origin in changed cutting conditions resulting from the tool break event. Most other acoustic tool break detectors operate above 100 KHz and concentrate on detecting the acoustic emission from the tool break event itself. Tests have shown that this acoustic emission signal is not always detectable because of the masking effects of the background noise in aggressive, high productivity machining, and that it is not generally desirable to stop the cutting process on detection of an acoustic emission not followed by a substantial change in cutting noise. Our approach is believed to be more appropriate to aggressive, high productivity machining where cutting noise background is likely to be high and where unnecessary stopping of the machining process is highly undesirable.

Figure 3:
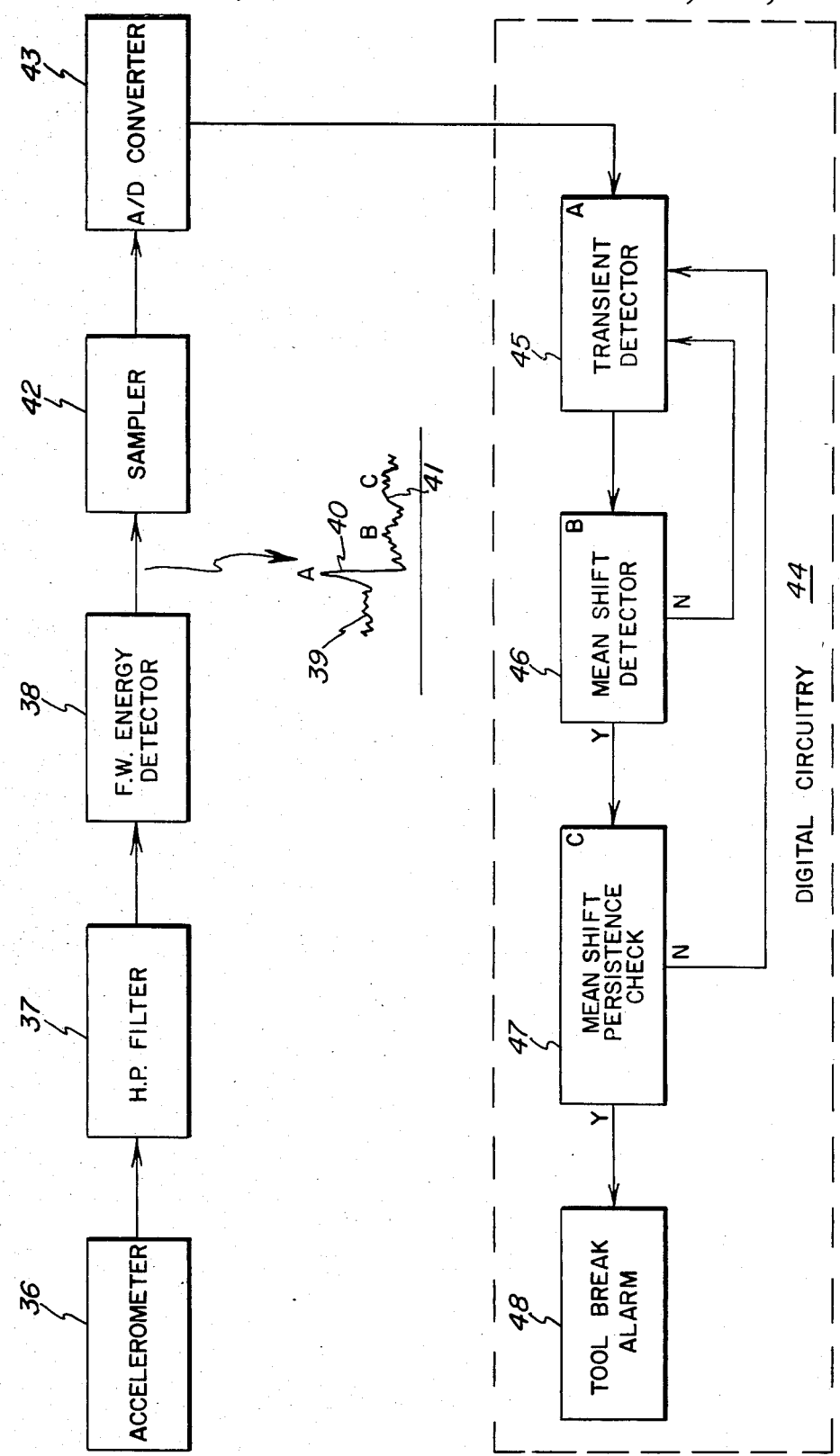
FIG. 3 is a block diagram of the tool break detection system and shows a filtered unipolar vibration signal that results in a tool break alarm.

The main features of the tool break detection system are indicated in FIG. 3. The sensor is a broadband accelerometer 36 with a flat response from very low frequencies to just below its resonant frequency in the vicinity of 30 KHz and above. This resonance is lightly damped, so the sensor is most sensitive to frequencies within a few kilohertz of its resonance, and sensitivity falls rapidly for frequencies much above the resonant frequency. One such high frequency vibration sensor is the Vibrametrics VM1018 accelerometer (Vibra-Metrics, Inc., Hamden, Conn.). The vibration signal is high-pass filtered in a filter 37 with a cutoff frequency slightly below the resonant frequency of the sensor to discriminate against and attenuate high amplitude machinery noise, which tends to be concentrated at lower frequencies. The combination of the resonant accelerometer and the high-pass filter produces a bandpass filtering of the vibration signals that favors frequencies in about a 20 KHz band in the vicinity of the accelerometer resonance frequency.

A full wave rectifier and low-pass filter combination acts as a full wave energy detector 38 (the filtering is too heavy for true envelope detection), converting the bipolar sensor signal to a unipolar "envelope" signal. The cutoff frequency of the low-pass filter is typically 500 Hz or less to prevent aliasing from the subsequent sampling operation as long as the sampling frequency is well above the 1 KHz Nyquist frequency. Thus, the sampling period can be long enough to accomplish the necessary digital analysis of the signal between analog signal samples. The cutoff frequency of the low-pass filter in fact may be as low as 100 Hz. One type of filtered unipolar signal at the output of the analog preprocessor, which is or which contains a major tool break event vibration signature, is shown in FIG. 3. The background cutting noise signal prior to the tool break event is indicated at 39. A short positive-going signal transient 40 well above the previous background noise level may be the acoustic emission from the cracking insert or it may be due to a momentary jamming of a broken piece of insert against the workpiece. This is followed at 41 by a sustained drop in the background cutting noise level usually due to a substantial reduction in depth of cut after part of the insert breaks away.

The signal samples of the output of the analog signal processing, extracted by sampler 42, are next converted to digital form by the analog-to-digital converter 43 and are further processed and analyzed by digital circuitry 44, which may be in the form of a programmable general purpose computer.

Figure 4:
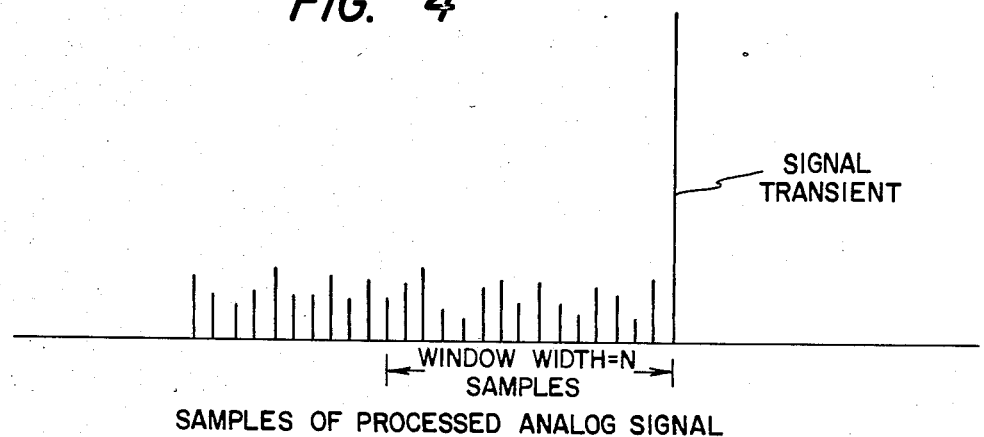
FIG. 4 shows the sampled signal and the "running mean" window.

As indicated in FIG. 3, the analysis of the digital signal samples is in three basic phases. First, a new signal sample (at A in FIG. 3) is compared with the mean signal value for the previous N samples, where N is the number of samples in a "running window" used for computing a running mean signal level. FIG. 4 illustrates the digitized samples of the processed analog signal and the "running mean" window. Typically, N would be 16. If this comparison of the new sample with the running mean signal level, performed by transient detector 45, indicates the presence of the abrupt or transient increase in signal level that might have its source in a major tool break event, phase 2 of the signal analysis procedure is entered.

The detection, in phase 1, of a signal transient that could have its source in a tool break event is not enough to warrant generating a tool break alarm. Experiments have shown that under some normal machining conditions without tool break events, many transient spikes occur in the accelerometer signals, and the amplitude-time characteristics of these transient spikes seriously overlap those of transient spikes generated by tool break events. Furthermore, there is evidence which indicates that transient spikes generated by minor or insignificant tool break events, which often should be ignored for maximum machine tool productivity, cannot be separated from other transient spikes generated by major tool break events capable of marring the workpiece. Adequate discrimination between tool break events and other transient sources, and between major and minor tool break events, therefore requires the use of a time window that looks not only at the transient itself, but also at the background noise level before and after the transient. This is the function of phase 2 of the digital signal sample analysis, performed by mean shift detector 46, which compares the mean background level after the transient spike (at B in FIG. 3) with the corresponding level immediately before the transient was detected. The running mean signal level is calculated using, say, 16 samples, and the after and before comparison is delayed long enough that the high amplitude of the transient signal sample is not included in the mean.

Phase 3 of the digital signal sample analysis, performed by mean shift persistence check detector 47, takes care of two more problems. First, there are some special case machine operations which can, without a tool break event, produce a transient spike followed by a shift of the mean level of the background noise. These operations (cutting through a previously machined hole and making an initial light cut on a rough surface) involve cutting metal, then cutting air, and then returning to cutting metal. Second, there are also some machining operations that can produce clusters of transient noise spikes so closely spaced that it is difficult to measure the background mean level between the spikes, or to be sure that a computed mean level is not artificially raised by spikes occurring within the mean window, thus producing a false apparent increase in the background mean level. Both of these problems are addressed by phase 3 (C in FIG. 3) which requires that an indicated shift of the mean level of the background cutting noise persist for a user-selected period. This period can be set long enough to assure that an apparent shift in the background level is not caused by noise spikes of any density that has been seen in experimental data to date; it can also be set long enough to assure that the apparent shift is not caused by air cutting. However, the confirmation period can usually be set shorter than the period of one revolution of the workpiece, so very rapid response to tool break events is obtained.

If the signal passes the tests of all three phases, a tool break alarm 48 is issued. When the mean shift test is failed, the system dismisses the transient as not indicative of a major tool break event, and it reverts to searching for another positive-going signal transient to check. When the mean shift persistence check is failed, the system returns control to the transient detector. Both criteria must be satisfied to generate an alarm.

Figure 5:
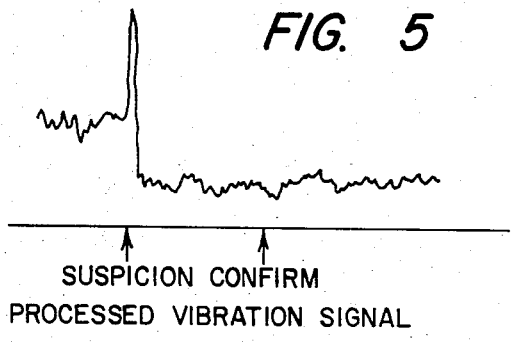
FIGS. 5-8 illustrate several processed analog vibration signals; the first two contain major tool break event signatures and trigger an alarm, and the second two represent minor tool break events or spurious noise and do not result in an alarm.
Figure 6:
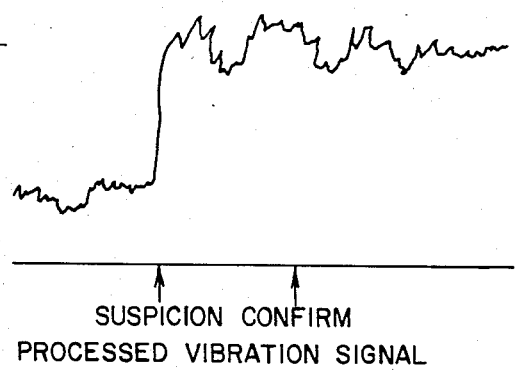

The tool break detection system is designed to detect the vibration signatures shown in FIGS. 5 and 6 which tests have shown to be associated with major tool break events, where the signals being analyzed are the filtered unipolar outputs of the analog signal channel. The processed vibration signal in FIG. 5 is the same as that in FIG. 3, having a short positive-going signal transient well above the previous mean signal level, followed by a sustained drop in mean signal level. The positive-going signal transient may be the acoustic emission from the cracking insert, or it may be due to a momentary jamming of a broken piece of insert against the workpiece. The sustained drop in mean signal is usually due to a substantial reduction in depth of cut after part of the insert breaks away. The positive-going transient meets the "break suspicion" or transient detect criterion of the computer logic, and the sustained drop in mean signal level meets the "suspicion confirmed" or persistence check criterion. Good detection performance is obtained.

The major tool break event signature in FIG. 6 is characterized by an abrupt, sustained increase in mean signal level. The increase may be due to jamming of a broken piece of the insert between the remainder of the insert and the workpiece, or to cutting with a jagged edge of the insert. The cracking event acoustic emission pulse is obscured by the high level of abnormal cutting noise. The abrupt rise in signal level meets the transient detect and "break suspicion" criterion, and the sustained high signal level meets the persistence check and "suspicion confirmed" criterion. Good detection performance is obtained.

Figure 7:
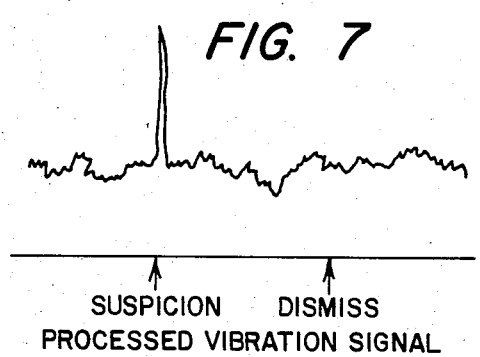
Figure 8:
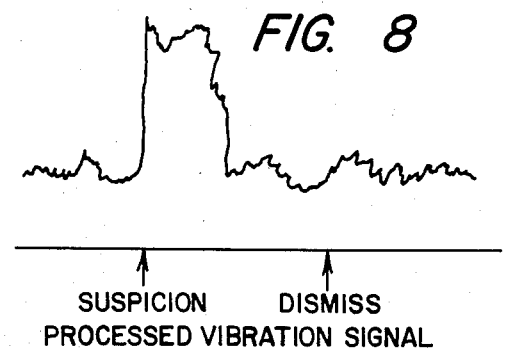

The broken tool detection system does not alarm on the signature types in FIGS. 7 and 8. The first has a short positive-going transient followed by a return to the previous signal mean level. The transient may be caused by acoustic emission due to insert cracking, but cutting conditions are not affected for one of the reasons given above. The transient may also be caused by spurious noise, such as chip dynamics noise. The "break suspicion" criterion is met but the confirmation criterion is not. Good false alarm control is obtained for spurious noise and insignificant tool breaks.

The processed vibration signal in FIG. 8 has a longer positive-going transient followed by a return to previous signal levels. The transient may be caused by a small chip breaking off the insert and momentarily jamming against the workpiece. It clears before significant damage is done to the workpiece, and the insert cutting edge is not affected. The transient detect and "break suspicion" criterion is met, but the persistence check and confirmation criterion is not. Good resistance to unnecessary alarms on minor tool break events is obtained.

The MTM (machine tool monitor) tool break detector does not require an elaborate teaching cycle during which it learns the patterns of acoustic waveforms produced as the part is machined. A usable level of break detection performance can be obtained without the use of any information on the specific cuts to be made. No teaching cycle or test and measure part cutting cycle will be required. This is in contrast to some tool break detection systems based upon monitoring spindle horsepower or tool forces. Such systems require that each cut in the process of machining a part be made while the detected parameter of horsepower or forces is monitored and recorded. Then time-varying limits on the detected parameter are set up for each cut, and a tool break is considered to have occurred whenever the detected parameter falls outside those limits. This generally requires that each cut be broken up into dozens of short blocks, with the detected parameter limits constant within a block, but changing from block to block. Such a system is expensive to implement, both in hardware/software requirements of the equipment and in set-up time. Its utility is generally limited to applications in which a large number of identical parts are to be machined, as opposed to those in which many different parts are to be machined. This invention relies primarily upon detection of and interpretation of transients and level shifts of the vibration signal, rather than crossings of absolute limits, and thus is able to provide good tool break detection performance without the use of any prior information on the specific cuts to be made.

The acoustic tool break detection system may be used as a stand-alone product or an option in a numerical machine tool control. It may be used with an automatic tool changing system. This broken tool detector and method is readily combined with an acoustic tool touch detector in a tool touch and tool break detecting system.

While the invention has been particularly shown and described with reference to preferred embodiments thereof, it will be understood by those skilled in the art that various changes in form and details may be made therein without departing from the spirit and scope of the invention.

What is claimed is:

1. A machine tool monitor for detecting cutting tool break events while machining a workpiece comprising:
   a broadband vibration sensor which generates an electrical signal representing vibrations at the tool-workpiece interface;
   analog signal processing means including a high-pass filter to attenuate lower frequency machinery noise, and a full wave energy detector to rectify and low-pass filter said signal;
   means for sampling the unipolar output signal of said analog processing means and converting each sample to digital form; and
   digital circuitry comprising means for comparing every sample with the running mean signal level of a given number of previous samples to detect the presence of a positive-going signal transient that may indicate a tool break event, means for comparing the mean signal level after and before said transient to detect a shift in mean level and a substantial change in background cutting noise, and means for generating a tool break alarm when the shift in mean level persists for a preselected period.

2. The monitor of claim 1 wherein said vibration sensor is an accelerometer most sensitive to frequencies around a resonant frequency which is above 30 KHz.

3. The monitor of claim 2 wherein the combination of said accelerometer and high-pass filter produces a band-pass filtering that favors frequencies in a band in the vicinity of said resonant frequency.

4. The monitor of claim 1 wherein the low-pass filter has a cutoff frequency less than 500 Hz to provide anti-aliasing filtering at the sampling rate of said sampling means.

5. A system for detecting cutting tool break events while machining a workpiece comprising:
   an accelerometer which is most sensitive to frequencies around a resonant frequency and is positioned on a machine tool to sense vibrations at the tool-workpiece interface and convert these and other vibrations to an electrical signal;
   an analog preprocessor including means for high-pass filtering said vibration signal to discriminate against lower frequency machinery noise, and means for rectifying and low-pass filtering said signal to detect the energy in a band around said resonant frequency;
   means for sampling the unipolar output signal of said analog preprocessor and converting each sample to digital form;
   digital circuitry to detect major tool break events capable of marring the workpiece and prevent false alarms on minor tool break events and spurious noise;
   said digital circuitry comprising means for calculating the running mean signal level of a selected number of samples, a transient detector to compare each new sample with the running mean and detect a transient increase in signal level that may have its source in a major tool break event, a mean shift detector to compare the mean signal level after and before said transient to detect a shift in background cutting noise, and means for checking that said mean shift persists for a given period and hence generating a tool break alarm.

6. The system of claim 5 wherein said mean shift detector returns control to said transient detector to search for another transient after failure to detect said mean shift.

7. The system of claim 5 wherein said last-mentioned means returns control to said transient detector to search for another transient after failure to meet a mean shift persistence check criterion.

8. The system of claim 5 wherein the resonant frequency of said accelerometer is above 30 KHz.

9. The system of claim 8 wherein said low-pass filtering means has a cutoff frequency of less than 500 Hz to provide anti-aliasing filtering at the signal sampling rate of said sampling means.

10. The method of detecting tool breakage capable of marring the workpiece comprising:
    sensing the vibrations of a cutting tool insert during a machining operation and converting these and other machine tool vibrations to an electrical signal;
    preprocessing said vibration signal by high-pass filtering to discriminate against lower frequency machinery noise, and rectifying and low-pass filtering to detect the signal energy, the output signal containing a positive-going transient that may indicate a major tool break event;
    sampling said output signal and converting each sample to digital form;
    detecting said transient by comparing every sample with the running mean signal level of N previous samples, comparing the mean signal level after and before said transient to detect a mean shift and dismissing any transient not followed by a substantial change in background cutting noise, checking that said mean shift persists for a given period and dismissing any transient not meeting this second criterion, and generating a tool break alarm when both criteria are satisfied.

* * * * *